United States Patent
Ichikawa et al.

(10) Patent No.: US 7,147,191 B2
(45) Date of Patent: Dec. 12, 2006

(54) DISPLAY TILTING APPARATUS

(75) Inventors: Toshiyuki Ichikawa, Tokyo (JP); Kenichi Miyazawa, Tokyo (JP); Noboru Ishii, Tokyo (JP); Takuma Yoshida, Tokyo (JP); Satoshi Nishioka, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 371 days.

(21) Appl. No.: 10/892,236

(22) Filed: Jul. 16, 2004

(65) Prior Publication Data
US 2005/0205735 A1 Sep. 22, 2005

(30) Foreign Application Priority Data
Feb. 13, 2004 (JP) ............... 2004-037197

(51) Int. Cl.
*E04G 3/00* (2006.01)
(52) U.S. Cl. .............. 248/292.12; 16/340; 248/371
(58) Field of Classification Search .......... 248/292.12, 248/292.11, 292.13, 291.1, 371, 372.1, 917, 248/918; 16/337, 340, 324, 326; 361/681, 361/682, 683; 403/11, 112, 113, 117
See application file for complete search history.

(56) References Cited

U.S. PATENT DOCUMENTS

| | | | | |
|---|---|---|---|---|
| 5,854,735 A | * | 12/1998 | Cheng | 361/681 |
| 5,913,351 A | * | 6/1999 | Miura | 16/340 |
| 5,940,936 A | * | 8/1999 | Lu | 16/337 |
| 5,970,819 A | * | 10/1999 | Katoh | 74/531 |
| 6,154,925 A | * | 12/2000 | Miura | 16/338 |
| 6,354,549 B1 | * | 3/2002 | Sweere et al. | 248/292.14 |
| 6,618,903 B1 | * | 9/2003 | Kim | 16/337 |
| 6,666,422 B1 | * | 12/2003 | Lu et al. | 248/291.1 |
| 6,779,234 B1 | * | 8/2004 | Lu et al. | 16/340 |
| 7,082,642 B1 | * | 8/2006 | Su | 16/340 |
| 7,096,536 B1 | * | 8/2006 | Johnson | 16/300 |
| 2005/0205735 A1 | * | 9/2005 | Ichikawa et al. | 248/292.12 |

FOREIGN PATENT DOCUMENTS

| | | |
|---|---|---|
| JP | 11-109895 | 4/1999 |
| JP | 2000-300370 | 10/2000 |
| JP | 2002-17218 | 1/2002 |

* cited by examiner

*Primary Examiner*—Carl D. Friedman
*Assistant Examiner*—Tan Le
(74) *Attorney, Agent, or Firm*—Armstrong, Kratz, Quintos, Hanson & Brooks, LLP

(57) ABSTRACT

A display tilting apparatus includes a moving bracket that supports a display, a ratchet mechanism that controls pivoting of the moving bracket to a first direction, an anti-tilting mechanism that inhibits pivoting of the moving bracket to a second direction that is opposite of the first direction, and a fixed bracket that is pivotably connected to the moving bracket via a pivot axis. The anti-tilting mechanism includes a first anti-tilting member, and a second anti-tilting member that is mounted on the fixed bracket. The first anti-tilting member and the second anti-tilting member are mounted so as to make a physical contact to each other.

9 Claims, 8 Drawing Sheets

DISPLAY TILTING APPARATUS

BACKGROUND OF THE INVENTION

1) Field of the Invention

The present invention relates to a technology for adjusting an angle of a liquid-crystal display (LCD) screen to improve operationality and safety by using a tilt-locking function of a ratchet mechanism and a anti-tilting function of an anti-tilting mechanism.

2) Description of the Related Art

Point-of-sales (POS) terminals are widely used in department stores and the restaurants as an information-display apparatus having an LCD screen. FIG. 8A and FIG. 8B are a perspective view and a side view of a conventional POS terminal 100, respectively. The POS terminal 100 includes an LCD screen 200, on which the operator performs the key-touch operation (for accounting operation or the like), a main body 100a, a printer 300, which prints a printing paper such as a receipt, and a controller 400. A receipt exit 500 is used to issue the receipts that the printer 300 prints.

A hinge 550 connects the LCD screen 200 and the main body 100a, and the ratchet mechanism (not shown), which includes a function for adjusting an angle of the LCD screen 200, is arranged in the hinge 550. In the operation of the LCD screen 200, the operator adjusts the angle of the LCD screen 200 to be a desirable position using the ratchet mechanism.

Japanese Patent Application Laid-Open No. 2000-300370 discloses an example of the display tilting apparatus that is used to connect a backrest and a seat of a legless chair, a sofa bed, or the like. This display tilting apparatus adjusts the angle of the backrest or the like to be a desirable position stepwise using the ratchet mechanism.

Another example of the display tilting apparatus that adjusts the angle of the LCD screen is a torque-hinge mechanism that uses a friction torque. The notebook computer has the torque-hinge mechanism, and the torque-hinge mechanism is arranged in a hinge that connects the LCD screen and a main body (keyboard). The LCD screen is tilted and fixed at any desirable position using the friction torque of the torque-hinge mechanism.

However, the conventional technologies have the following problems in adjusting the angle of the LCD screen. When the hinge has the ratchet mechanism, the LCD screen 200 can be fixed at any desirable position on the printer's side by engaging a ratchet gear with a locking pawl (to lock). On the other hand, the tilt-locking function of the ratchet mechanism does not work when the LCD screen 200 tilts to the operator's side, and the LCD screen 200 unexpectedly falls toward the operator. Therefore, there is a problem in safety when the ratchet mechanism is arranged in the hinge of the POS terminal.

When the hinge of the POS terminal has the torque-hinge mechanism, the LCD screen 200 can be tilted and supported at any desirable position using the friction torque (the friction drag) of the torque-hinge mechanism.

When the operator adjusts the angle of the LCD screen, preferably, the angle of the LCD screen can be adjusted with the comparatively weak force by configuring the strength of the friction torque similarly with the ratchet mechanism. On the other hand, when the operator performs the key-touch operation on the LCD screen and put some pressure on the LCD screen, it is required to have strength for retaining the angle of the LCD screen. Therefore, satisfying the contradict friction-torques is extremely difficult.

SUMMARY OF THE INVENTION

It is an object of the present invention to solve at least the problems in the conventional technology.

The display tilting apparatus according to one aspect of the present invention includes a moving bracket that supports a display; a ratchet mechanism that controls pivoting of the moving bracket to a first direction; an anti-tilting mechanism that inhibits pivoting of the moving bracket to a second direction that is opposite of the first direction; and a fixed bracket that is pivotably connected to the moving bracket via a pivot axis. The anti-tilting mechanism includes a first anti-tilting member that inhibits pivoting of the moving bracket; and a second anti-tilting member that is mounted on the fixed bracket. The first anti-tilting member and the second anti-tilting member are mounted so as to make a physical contact to each other.

The display tilting apparatus according to anther aspect of the present invention includes a moving bracket that pivotably supports a display; a ratchet mechanism that controls pivoting of the moving bracket to a first direction; an anti-tilting mechanism that inhibits pivoting of the moving bracket to a second direction that is opposite of the first direction; and a fixed bracket that is pivotably connected to the moving bracket via a pivot axis. The anti-tilting mechanism includes an anti-tilting member that inhibits pivoting of the moving bracket. The anti-tilting member includes a first surface that has a first salient part, and the fixed bracket includes a second surface that has a second salient part. The first surface and the second surface make a contact to each other.

The other objects, features, and advantages of the present invention are specifically set forth in or will become apparent from the following detailed description of the invention when read in conjunction with the accompanying drawings.

DETAILED DESCRIPTION

Exemplary embodiments of a display tilting apparatus according to the present invention are explained in detail with reference to the accompanying diagrams. In explanations of a first embodiment and a second embodiment, it is assumed that the information-display apparatus is a POS terminal and the display tilting apparatus is arranged in the hinge of the POS terminal. The configuration and the function of the present invention are not limited to those of the first embodiment and the second embodiment.

Figure 1:
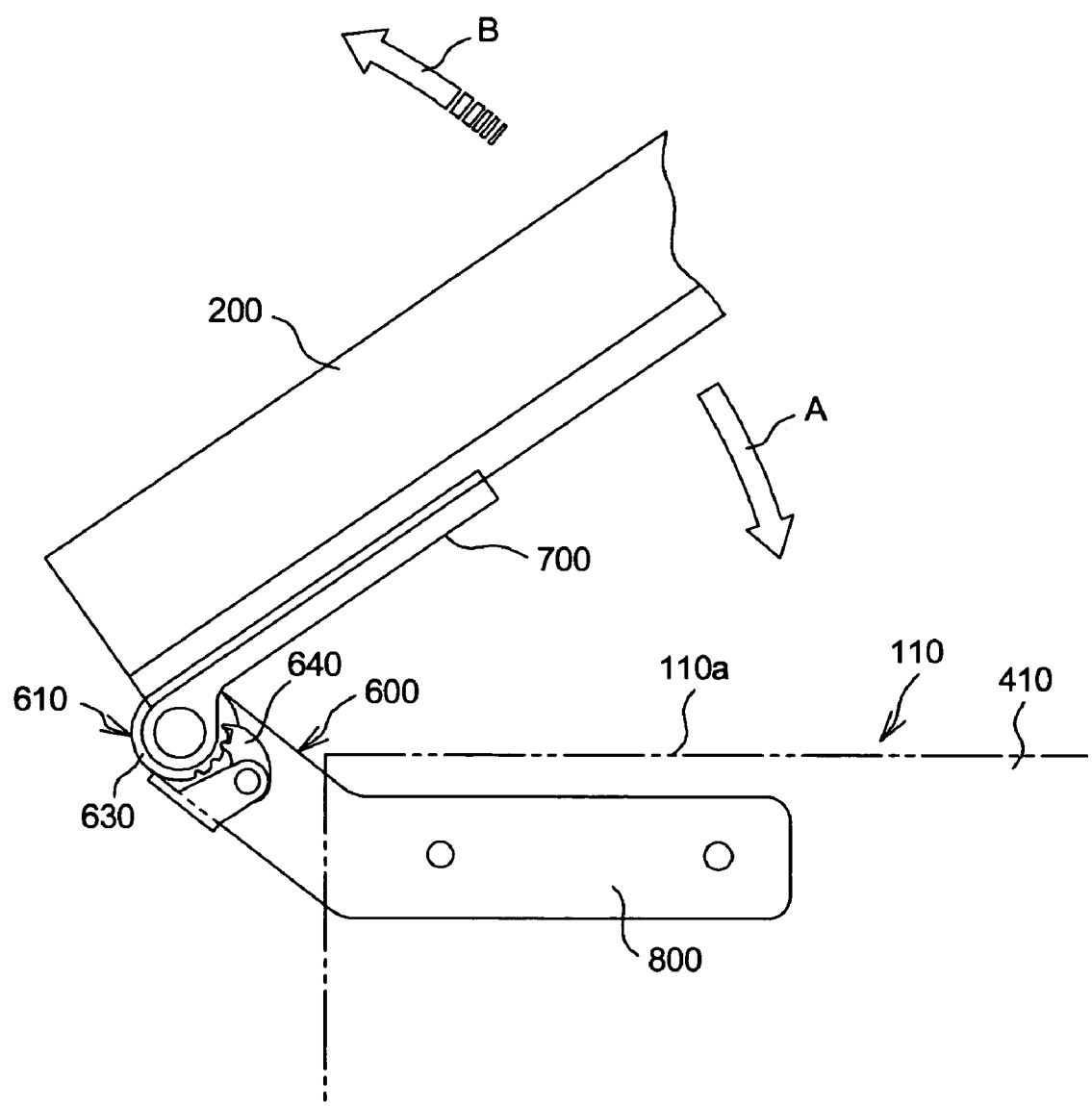
FIG. 1 is a side view of a display tilting apparatus according to a first embodiment of the present invention.
Figure 2:
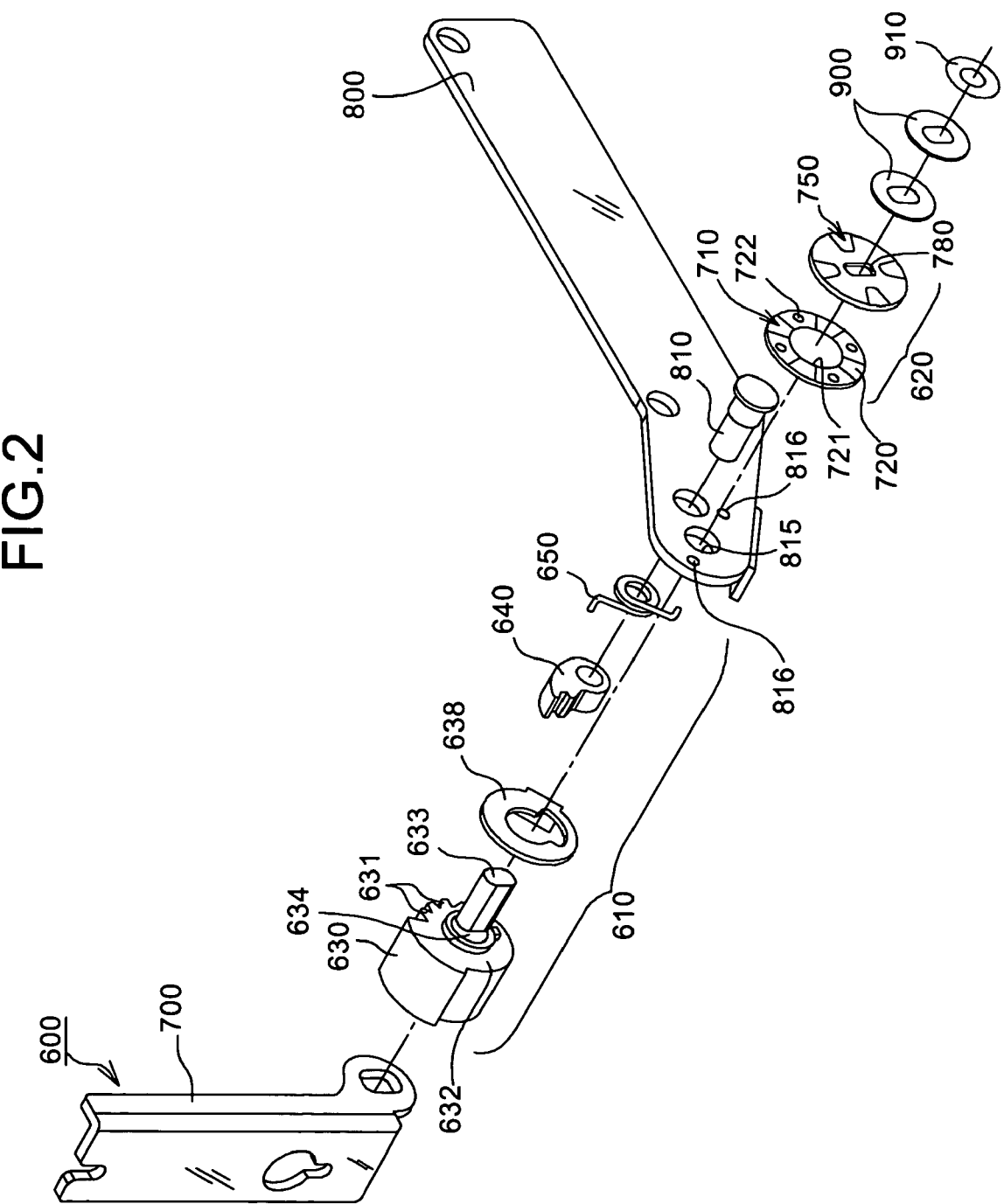
FIG. 2 is an exploded view of the display tilting apparatus.
Figure 3:
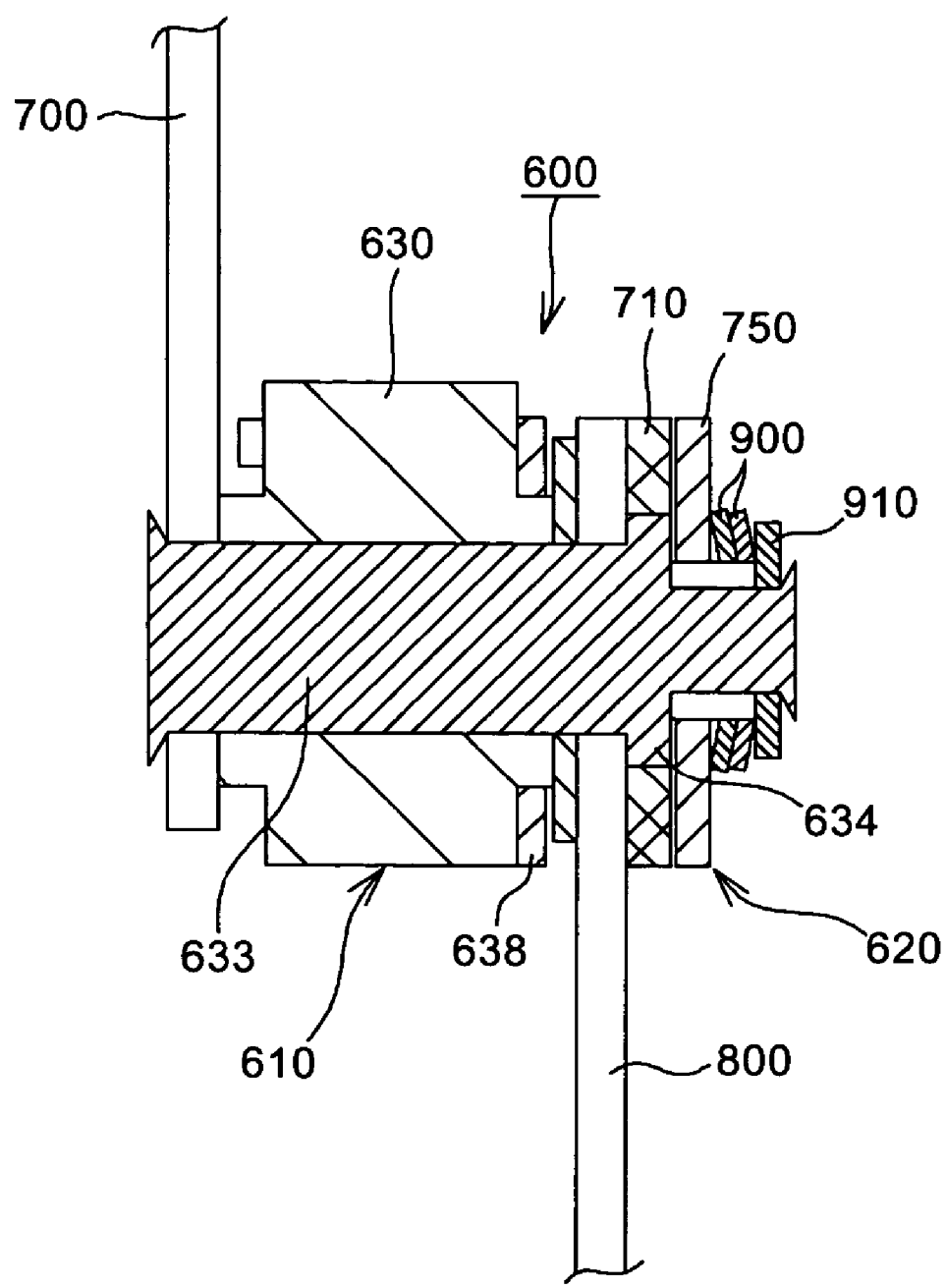
FIG. 3 is a cross-section of main parts of the display tilting apparatus.

FIG. 1 is a side view of a display tilting apparatus according to a first embodiment of the present invention. FIG. 2 is an exploded view of the display tilting apparatus. FIG. 3 is a cross-section of main parts of the display tilting apparatus.

A POS terminal 110 includes the LCD screen 200, on which the operator performs the key-touch operation (for accounting operation), the main body 100a, the printer 300, which prints a printing paper such as a receipt, and a controller 400. The both sides of the LCD screen 200 are fitted with a pair of moving brackets 700 using screws, and a fixed bracket 800, which is connected to an end of the moving bracket 700, is fitted with a side 410 of the main body 100a using screws. A display tilting apparatus 600 according to the present invention is arranged in a connection (a hinge) between the moving bracket 700 and the fixed bracket 800.

As shown in FIG. 1 and FIG. 2, the display tilting apparatus 600 includes a ratchet mechanism 610, which tilts the LCD screen 200 to the first pivot-direction (toward printer side) and adjusts the angle of the LCD screen 200 to be any desirable angle, and an anti-tilting mechanism 620, which tilts the LCD screen 200 to the second pivot-direction (toward operator side) and inhibits the angle of the LCD screen 200 to be any desirable angle. The ratchet mechanism 610 is arranged between the moving bracket 700 and the fixed bracket 800, and the anti-tilting mechanism 620 is arranged so that the fixed bracket 800 is arranged between the ratchet mechanism 610 and the anti-tilting mechanism 620.

The feature of the display tilting apparatus 600 according to the first embodiment is that the ratchet mechanism 610 adjusts the angle of the LCD screen 200 to the first pivot-direction by adjusting the position where a ratchet gear 630 is engaged with a locking pawl 640 (hereinafter, "an engaged position"), and the anti-tilting function of the anti-tilting mechanism 620 adjusts the angle of the LCD screen 200 to the second pivot-direction (regarding the engaged position, three engaged positions are shown in FIG. 1). Actually, the anti-tilting mechanism 620 is not prepared for adjusting the angle of the LCD screen 200, but prepared for inhibiting the LCD screen 200 from falling toward the operator's side unexpectedly.

As shown in FIG. 2 and FIG. 3, the ratchet mechanism 610 includes the ratchet gear 630, a cam 638 for operating a locking pawl, the locking pawl 640, and a coil spring 650. A plurality of ratchet teeth 631 are formed in the ratchet gear 630 (three ratchet teeth 631 are shown in FIG. 2). A through-hole 632 is arranged in the center of the ratchet gear 630. A pivot shaft 633 includes a step 634, has the D-shape, and is fitted into the through-hole 632. Although the ratchet gear 630 and the pivot shaft 633 are separated in the present embodiment, the ratchet gear 630 and the pivot shaft 633 may be configures to integrate each other.

The coil spring 650 is fitted around a rivet 810, which is fixed in the fixed bracket 800, and powered so that the ratchet tooth 631 of the ratchet gear 630 is engaged with the locking pawl 640. By engaging the ratchet gear 630 with the locking pawl 640, the angle of the LCD screen 200 is retained at a certain angle. Consequently, the angle of the LCD screen 200 can be adjusted by adjusting the engaged position of the ratchet gear 630 and the locking pawl 640 (three engaged positions are shown in FIG. 2).

The pivot shaft 633 penetrates a circular hole 815, which is formed in the fixed bracket 800, a circular hole 721 of a fixed-side anti-tilting plate 710, which the anti-tilting mechanism 620 includes, and a hole 780 of a moving-side anti-tilting plate 750. The end of the pivot shaft 633 is fixed by caulking via two spring washers 900 and a washer 910. Therefore, the moving-side anti-tilting plate 750 and the fixed-side anti-tilting plate 710 are mounted to clamp each other using the spring washers 900. Moreover, the step 634 formed on the pivot shaft 633 is fitted into the circular hole 721 of the fixed-side anti-tilting plate 710. Consequently, the LCD screen 200 can pivot stably.

The anti-tilting mechanism 620 includes the fixed-side anti-tilting plate 710 and the moving-side anti-tilting plate 750, which are formed circular, and the fixed-side anti-tilting plate 710 and the moving-side anti-tilting plate 750 are mounted so that a side of the fixed-side anti-tilting plate 710 and a side of the moving-side anti-tilting plate 750 clamp each other.

Figure 4A:
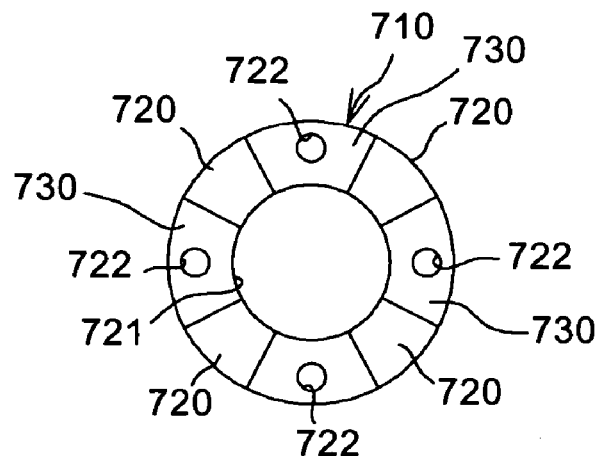
FIG. 4A is a plan view of a fixed-side anti-tilting plate.
Figure 4B:
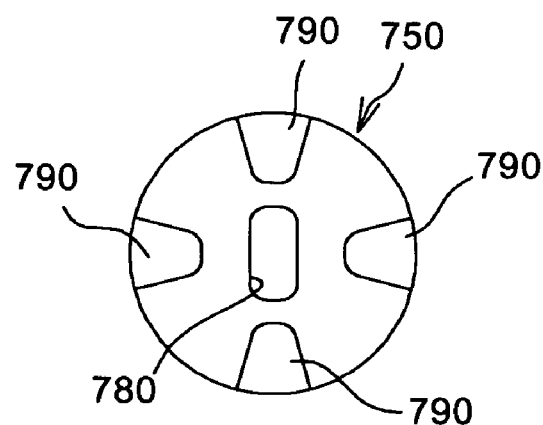
FIG. 4B is a plan view of a moving-side anti-tilting plate.

FIG. 4A is a plan view of a fixed-side anti-tilting plate 710; and FIG. 4B is a plan view of a moving-side anti-tilting plate 750. In the center of the fixed-side anti-tilting plate 710, the circular hole 721, into which the step 634 of the pivot shaft 633 can be fitted, is formed and a plurality of small circular-holes 722, which can be engaged with engaging pins 816 mounted on the end of the fixed bracket 800, are formed (four small circular-holes 722 are shown in FIG. 4A). On a side, where the engaging pins 816 do not slide, of the fixed-side anti-tilting plate 710, a plurality of salient parts 720 are formed (four salient parts 720 are shown in FIG. 4A). The salient parts 720 are formed to make an angle of 90 degrees to each other. The small circular-hole 722 is formed in a concave part 730. Although the salient parts 720 are formed to make an angle of 90 degrees to each other in the present embodiment, the number of the salient parts 720 and the positions where the salient part 720 are formed are not to be thus limited but may be specified appropriately.

In the center of the moving-side anti-tilting plate 750, the hole 780, which the end of the pivot shaft 633 can be engaged into and has a D-shape, is formed. On the side of the moving-side anti-tilting plate 750, a plurality of salient parts 790 are formed (four salient parts 790 are shown in FIG. 4A). The fixed-side anti-tilting plate 710 and the moving-side anti-tilting plate 750 are mounted so that the salient parts 720 and the salient parts 790 clamp each other.

Figure 5A:
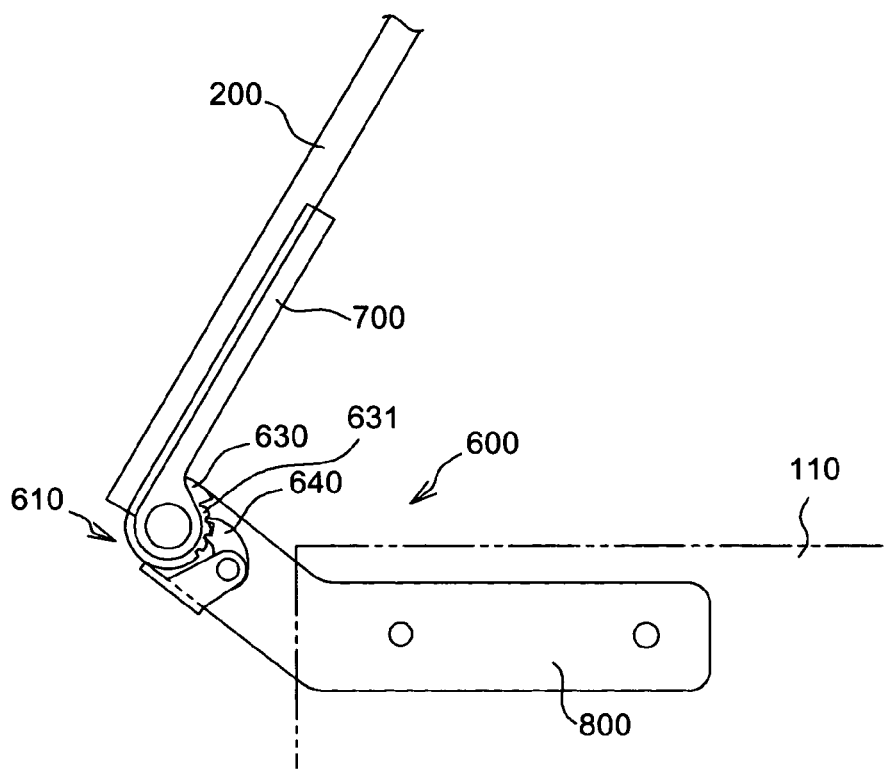
FIG. 5A is a side view of an LCD screen for illustrating adjustment of a tilting position by ratchet mechanism (up position)
Figure 5B:
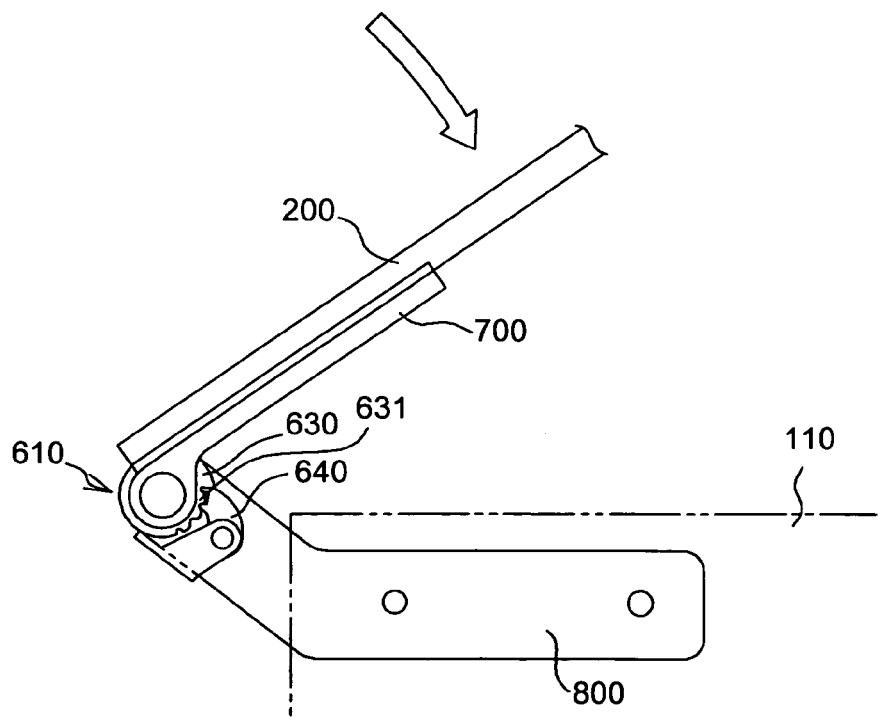
FIG. 5B is a side view of the LCD screen for illustrating adjustment of the tilting position by ratchet mechanism (down position)

FIG. 5A and FIG. 5B are side views of an LCD screen for illustrating adjustment of a tilting position by ratchet mechanism with an up position and a down position, respectively. The ratchet mechanism 610 adjusts the angle of the LCD screen 200 to the first pivot-direction by adjusting the engaged position (three engaged positions) of the ratchet gear 630 and the locking pawl 640. The angle of the LCD screen 200 is in the initial state, and adjusted by engaging a ratchet tooth 631A, which is the middle ratchet tooth of the ratchet teeth 631, with the locking pawl 640. The LCD screen 200 is more tilted to the printer's side, and the angel of the LCD screen 200 is adjusted by engaging a ratchet tooth 631B, which is the upper ratchet tooth of the ratchet teeth 631, with the locking pawl 640.

Figure 6A:
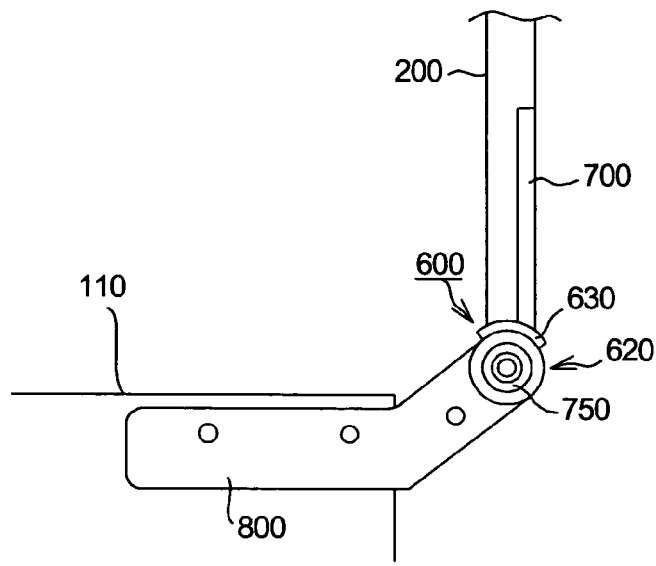
FIG. 6A is a side view of the LCD screen for illustrating adjustment of the tilting position by a moving-side anti-tilting mechanism (up position, 0 degree)
Figure 6B:
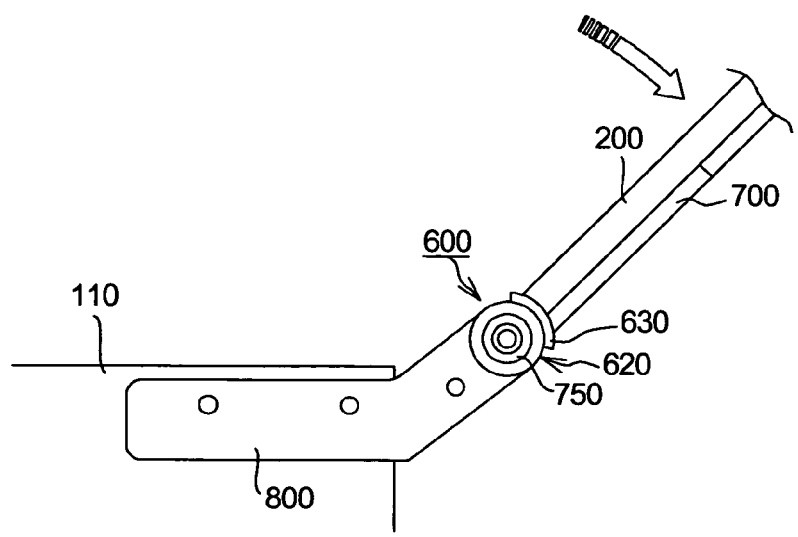
FIG. 6B is a side view of the LCD screen for illustrating adjustment of the tilting position by the moving-side anti-tilting mechanism (down position, 45 degrees)
Figure 6C:
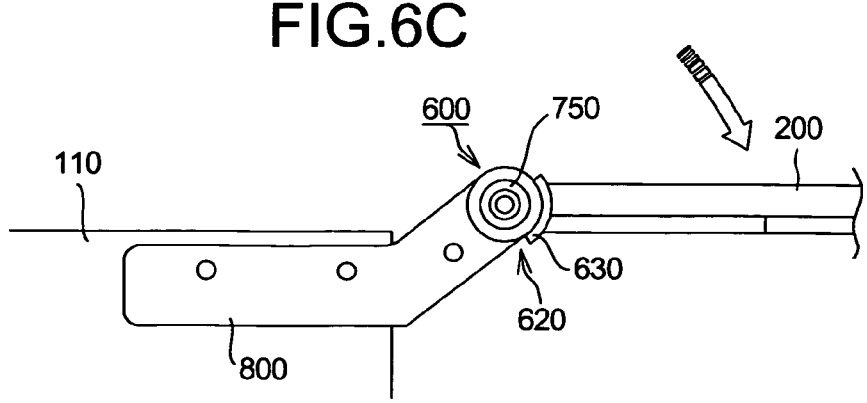
FIG. 6C is a side view of the LCD screen for illustrating adjustment of the tilting position by the moving-side anti-tilting mechanism (down position, 90 degrees)

FIG. 6A, FIG. 6B, and FIG. 6C are side views of the LCD screen for illustrating adjustment of the tilting position by a moving-side anti-tilting mechanism with an up position (0 degree), a down position, (45 degrees), and a down position (90 degrees), respectivley. The LCD screen 200 shown in FIG. 6A is not tilted, the LCD screen 200 shown in FIG. 6B is tilted at 45 degrees, and the LCD screen 200 shown in FIG. 6C is tilted at 90 degrees.

When the operator tilts the LCD screen 200 to the front side (toward operator side), that is, the state of the LCD screen 200 changes from the state shown in FIG. 6A to the state shown in FIG. 6B or FIG. 6C, the moving bracket 700 fitted on the LCD screen 200 pivots with the LCD screen 200, and the pivot shaft 633, which is connected to the moving bracket 700, pivots with the LCD screen and drives the moving-side anti-tilting plate 750 to pivot. When the moving bracket 700 pivots, the salient part 790 formed on the moving-side anti-tilting plate 750 and the salient part 720 of the fixed-side anti-tilting plate 710, which are clamped on each other, interfere with each other, so that the friction torque occurs.

Figure 7A:
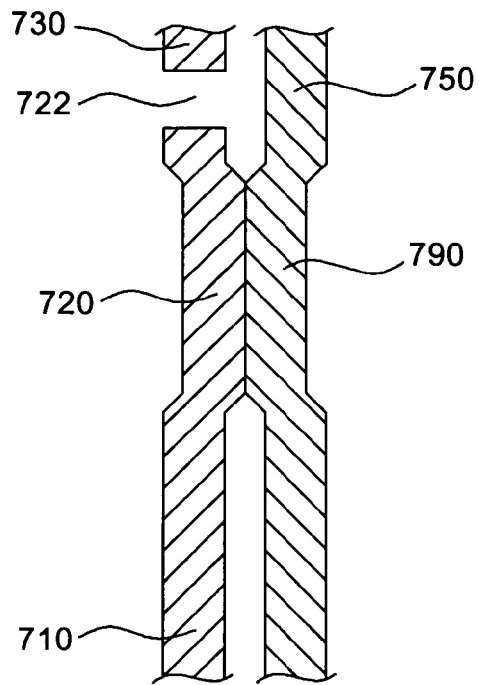
FIG. 7A is an enlarged cross-section of the fixed-side anti-tilting plate and the moving-side anti-tilting plate in a state that salient parts of both sides are making a contact to each other.
Figure 7B:
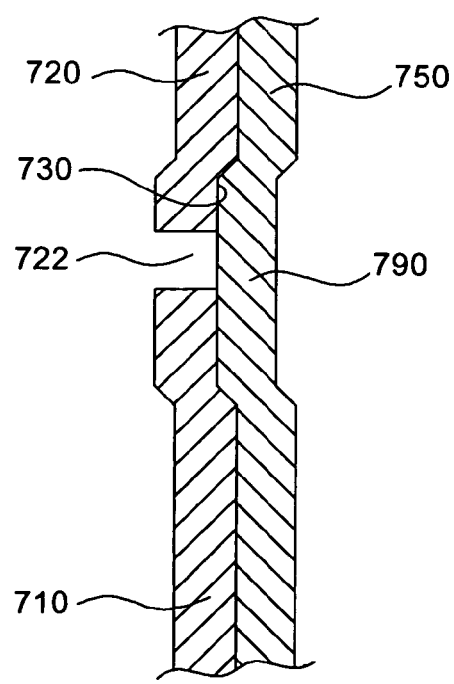
FIG. 7B is an enlarged cross-section of the fixed-side anti-tilting plate and the moving-side anti-tilting plate in a state that the salient parts of the both sides are released from each other.
Figure 8A:
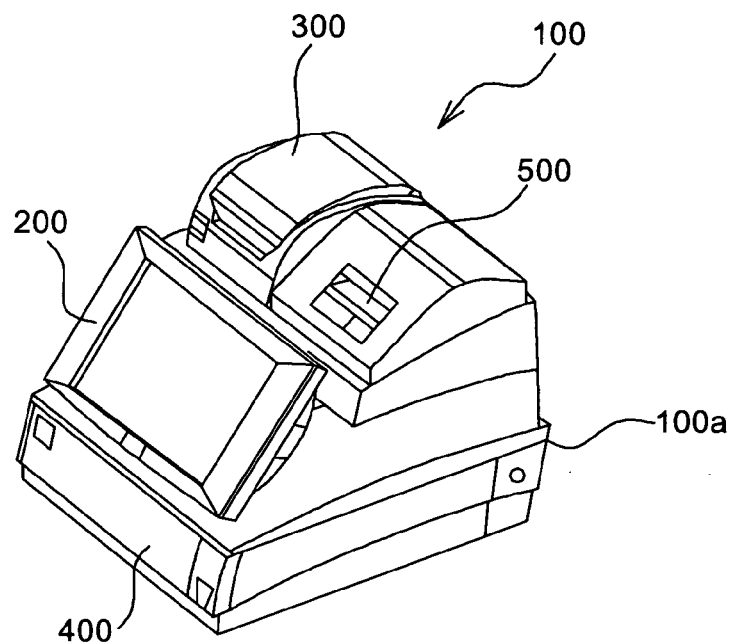
FIG. 8A is a perspective of a conventional POS terminal.
Figure 8B:
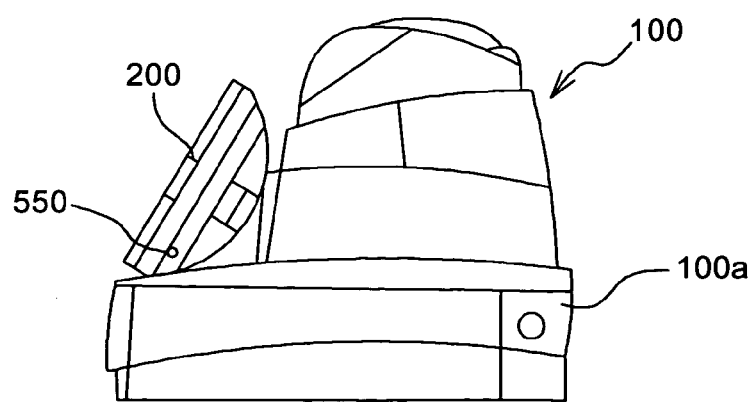
FIG. 8B is a side view of the conventional POS terminal.

FIG. 7A and FIG. 7B are enlarged cross-sections of the fixed-side anti-tilting plate 710 and the moving-side anti-tilting plate 750 in a state that salient parts of both sides are making a contact to each other and in a state that the salient parts of the both sides are released from each other, respectively. In the state shown in FIG. 7A, the salient part 720 and the salient part 790 are clamped on each other and interfere with each other, so that it is prevented that the LCD screen 200 pivots unexpectedly. On the other hand, in the state shown in FIG. 7B, the operator pivots the moving bracket 700, so that the salient part 720 and the salient part 790 are not clamped on each other any more and the concave part 730 of the fixed-side anti-tilting plate 710 is engaged with the salient part 790 of the moving-side anti-tilting plate 750. In this case, the fixed-side anti-tilting plate 710 and the moving-side anti-tilting plate 750 do not interfere with each other, so that the operator can pivot the LCD screen 200 manually and easily.

In this manner, the display tilting apparatus 600 according to the first embodiment, the display tilting apparatus 600 includes the ratchet mechanism 610, which pivots the LCD screen 200 to the first pivot-direction, and the anti-tilting mechanism 620, which inhibits the LCD-screen 200 from pivoting to the second pivot-direction. Consequently, the LCD screen 200 can be pivoted to the first pivot-direction and the angel of the LCD screen 200 can be adjusted comparatively easily using the ratchet mechanism 610. Moreover, the LCD screen 200, whose angle is adjusted by the ratchet mechanism 610, can be supported with retention strength by engaging the ratchet gear 630 with the locking pawl 640 even when the operator performs the key-touch operation on the LCD screen 200.

On the other hand, in tilting the LCD screen 200 to the operator's side, the anti-tilting mechanism 620 inhibits the LCD screen 200 from pivoting unexpectedly. Consequently, the anti-tilting mechanism 620 prevents the LCD screen 200 from tilting to the operator's side unexpectedly.

Although the display tilting apparatus 600 includes the fixed-side anti-tilting plate 710 and the moving-side anti-tilting plate 750 in the first embodiment, in a second embodiment, the fixed-side anti-tilting plate 710 may be omitted by forming the salient part 720 on the side (the end) of the fixed bracket 800 directly. In the second embodiment, the effect, which is same as the first embodiment, of the anti-tilting function is realized by clamping the salient part 790, which is formed on the surface of the moving-side anti-tilting plate 750, on the salient part 720, which is formed on the surface of the fixed bracket 800.

In this manner, in the second embodiment, the same effect as the first embodiment is realized, and the cost reduction is realized by reducing the number of the components, namely by omitting the fixed-side anti-tilting plate 710.

Although the display tilting apparatus is applied to the LCD screen of the POS terminal in the first embodiment and the second embodiment, the present invention is not to be thus limited but may be applied to the panels, for customers, of the commutation-ticket vending machine and the automatic teller machine (ATM) of the bank and the like.

As stated above, the display tilting apparatus according to the present invention is useful in adjusting the angle of the LCD screen, and especially, suitable for adjusting the angle of the LCD screen of the information-display apparatus, such as the POS terminal.

Consequently, the effect of the present invention is that the angle of the LCD screen to the operator's side can be adjusted to any desirable angle stepwise, it is prevented that the LCD screen tilts to the operator's side unexpectedly and undisturbedly, the operatability improves, and the LCD screen pivots stably even when the anti-tilting function works.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A display tilting apparatus comprising:
   a moving bracket that supports a display;
   a ratchet mechanism that controls pivoting of the moving bracket to a first direction;
   an anti-tilting mechanism that inhibits pivoting of the moving bracket to a second direction that is opposite of the first direction; and
   a fixed bracket that is pivotably connected to the moving bracket via a pivot axis, wherein
   the anti-tilting mechanism includes
      a first anti-tilting member that inhibits pivoting of the moving bracket; and
      a second anti-tilting member that is mounted on the fixed bracket, and
   the first anti-tilting member and the second anti-tilting member are mounted so as to make a physical contact to each other.

2. The display tilting apparatus according to claim 1, wherein pivoting of the moving bracket with respect to the fixed bracket is inhibited by a friction torque between the first anti-tilting member and the second anti-tilting member.

3. The display tilting apparatus according to claim 1, wherein
   the first anti-tilting member includes a first surface,
   the second anti-tilting member includes a second surface that makes a contact to the first surface, and
   both the first surface and the second surface have a plurality of salient parts.

4. The display tilting apparatus according to claim 1, wherein the fixed bracket is arranged between the ratchet mechanism and the anti-tilting mechanism.

5. The display tilting apparatus according to claim 1, wherein the ratchet mechanism includes
- a pivot shaft that transmits pivoting of the moving bracket;
- a ratchet gear; and
- a locking pawl that engages with the ratchet gear, and
- the pivot shaft and the ratchet gear are formed in one piece.

6. The display tilting apparatus according to claim 5, wherein
- the pivot shaft includes a step, and
- the step is fitted into the second anti-tilting member.

7. A display tilting apparatus comprising:
- a moving bracket that pivotably supports a display;
- a ratchet mechanism that controls pivoting of the moving bracket to a first direction;
- an anti-tilting mechanism that inhibits pivoting of the moving bracket to a second direction that is opposite of the first direction; and
- a fixed bracket that is pivotably connected to the moving bracket via a pivot axis, wherein
- the anti-tilting mechanism includes an anti-tilting member that inhibits pivoting of the moving bracket,
- the anti-tilting member includes a first surface that has a first salient part,
- the fixed bracket includes a second surface that has a second salient part, and
- the first surface and the second surface make a contact to each other.

8. The display tilting apparatus according to claim 7, wherein the fixed bracket is arranged between the ratchet mechanism and the anti-tilting mechanism.

9. The display tilting apparatus according to claim 7, wherein the ratchet mechanism includes
- a pivot shaft that transmits pivoting of the moving bracket;
- a ratchet gear; and
- a locking pawl that engages with the ratchet gear, and
- the pivot shaft and the ratchet gear are formed in one piece.

* * * * *